(12) United States Patent
Keats et al.

(10) Patent No.: US 8,519,654 B2
(45) Date of Patent: Aug. 27, 2013

(54) MICROCHP WITH IMPROVED SHUT DOWN SYSTEM

(75) Inventors: Luther Keats, Christchurch (NZ); Vinod Kumar, Christchurch (NZ)

(73) Assignee: Suma Algebraica, S.L., Aretxabaleta (ES)

( * ) Notice: Subject to any disclaimer, the term of this patent is extended or adjusted under 35 U.S.C. 154(b) by 923 days.

(21) Appl. No.: 12/597,048

(22) PCT Filed: Apr. 18, 2008

(86) PCT No.: PCT/NZ2008/000086
§ 371 (c)(1),
(2), (4) Date: Dec. 16, 2009

(87) PCT Pub. No.: WO2008/130249
PCT Pub. Date: Oct. 30, 2008

(65) Prior Publication Data
US 2010/0296244 A1 Nov. 25, 2010

(30) Foreign Application Priority Data
Apr. 18, 2007 (NZ) ........................................ 554632

(51) Int. Cl.
*H02P 27/06* (2006.01)
*F01K 13/02* (2006.01)
(52) U.S. Cl.
USPC ............................ 318/400.3; 361/695; 60/516

(58) Field of Classification Search
USPC ........ 318/400.3, 722, 800; 361/695; 307/66; 60/516, 668
See application file for complete search history.

(56) References Cited

U.S. PATENT DOCUMENTS

| | | | | |
|---|---|---|---|---|
| 4,104,535 | A * | 8/1978 | Bronicki | 290/52 |
| 4,665,707 | A * | 5/1987 | Hamilton | 62/3.3 |
| 4,982,569 | A * | 1/1991 | Bronicki | 60/698 |
| 6,598,397 | B2 | 7/2003 | Hanna et al. | |
| 7,603,874 | B2 * | 10/2009 | Fink et al. | 62/434 |
| 2003/0213247 | A1 | 11/2003 | Hanna et al. | |
| 2010/0097040 | A1 * | 4/2010 | Boisvert et al. | 322/40 |
| 2012/0313443 | A1 * | 12/2012 | Cheng et al. | 307/82 |

FOREIGN PATENT DOCUMENTS
WO WO 03/076857 A 9/2003

* cited by examiner

*Primary Examiner* — Eduardo Colon Santana
(74) *Attorney, Agent, or Firm* — Greer, Burns & Crain, Ltd.

(57) ABSTRACT

A microCHP unit including at least one pump (20) and/or fan for circulating a cooling fluid or air through the microCHP unit in normal operation. The microCHP unit comprises an electric power source (32) that is independent from the mains power supply. It also comprises a voltage converter (42) or inverter (44) or both connected between the independent power source (32) and the cooling pump(s) (20) and/or fan(s) (28) of the microCHP unit for converting a supply voltage from the independent electric power source (32) to a different voltage for operating the pump(s) (20) and/or fan(s) (28). A controller (34) is provided to cause the cooling pump(s) 20 and/or fan(s) (28) to operate in the absence of mains power. A charging device (48) is provided to recharge the independent power source (32) when the mains power supply is available.

11 Claims, 1 Drawing Sheet

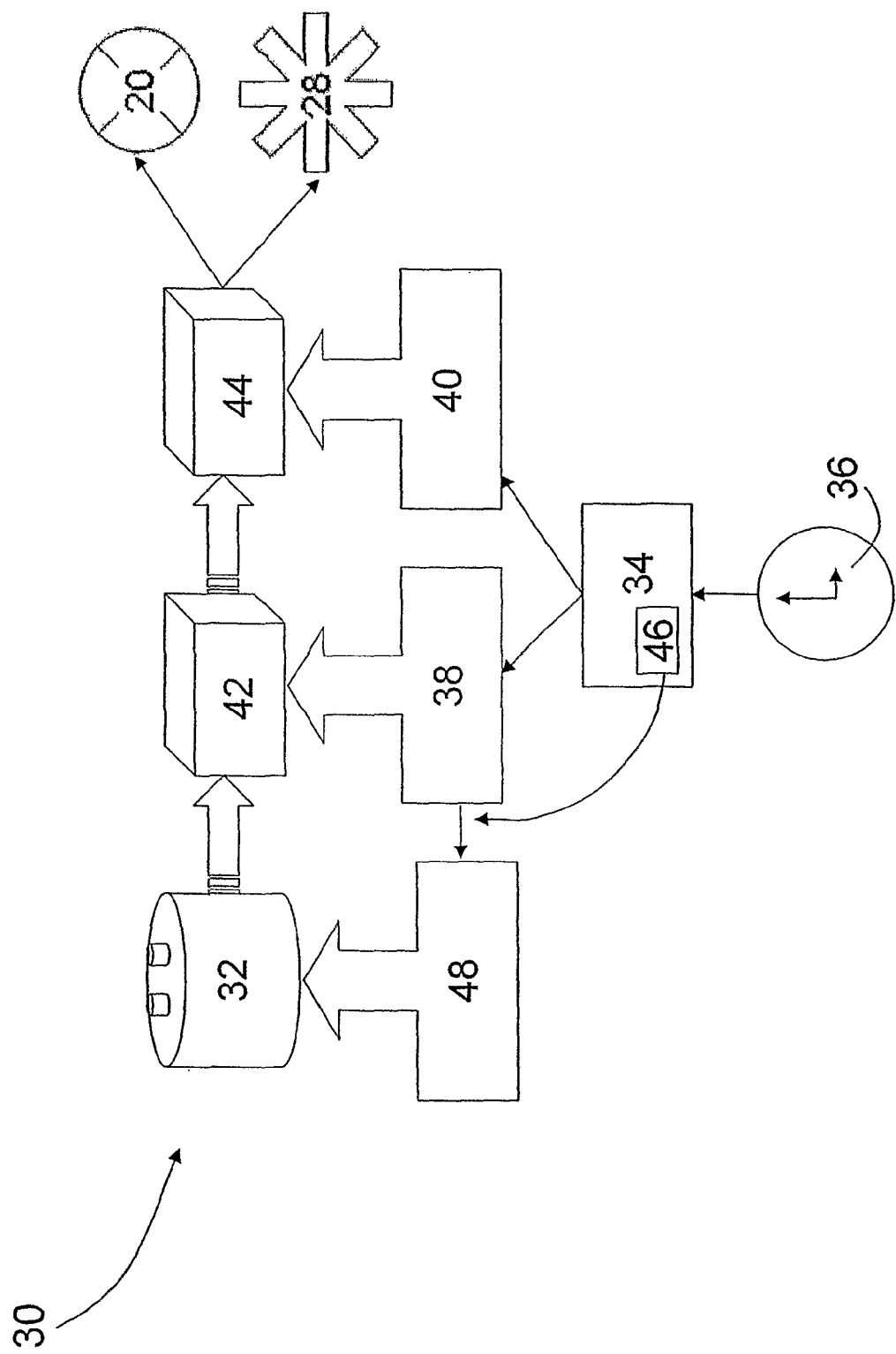

MICROCHP WITH IMPROVED SHUT DOWN SYSTEM

This application is a 371 of PCT/NZ2008/000086 filed on Apr. 18, 2008, published on Oct. 30, 2008 under publication number WO 2008/130249 A and claims priority benefits of New Zealand Patent Application No. 554632 filed Apr. 18, 2007 the disclosure of which is hereby incorporated by reference.

FIELD OF THE INVENTION

The invention relates generally to a method and apparatus used for the safe shut down of a micro combined heat and power cogeneration unit (microCHP) without damage on mains power failure.

BACKGROUND OF THE INVENTION

A domestic co-generation (microCHP) unit uses a Stirling engine, a burner and an alternator to produce both electricity and heat for water and/or space heating. A microCHP typically comprises at least one water pump and at least one fan which circulate cooling water and air through the engine during operation, and which are typically powered from the mains supply. If mains power is removed when the engine is (or has recently been) running, the water pump and fan providing both the required types of cooling also immediately shut down. The mains power supply to the microCHP may cease due to a consumer's prepaid power credit running out for example.

International PCT patent application publication WO 03/076857 discloses a domestic combined heat and power unit with an additional power supply situated within a grid independent module. This power supply is used to start the microCHP in the absence of mains supply. The power supply is a battery for example, and is used only for supplying the control means, the ignitor and the pulse generator.

SUMMARY OF THE INVENTION

It is an object of the invention to provide a microCHP unit that will shut down without damage, when running and when the mains power supply fails, or at least to provide the public with a useful choice.

In broad terms in a first aspect the invention comprises a microCHP unit including at least one pump and/or fan for circulating a cooling fluid or air through the microCHP unit in normal operation comprising:

an electric power source independent from the mains power supply;

a voltage converter or inverter or both connected between the independent power source and the cooling pump(s) and/or fan(s) of the microCHP unit for converting a supply voltage from the independent electric power source to a different voltage for operating the pump(s) and/or fan(s);

a controller arranged to cause the cooling pump(s) and/or fan(s) to operate in the absence of mains power; and a charging device arranged to recharge the independent power source when the mains power supply is available.

Preferably, the controller is arranged to sense both loss of power supply and sub-optional power conditions from the mains power supply and to control the cooling pump(s) and/or fans(s) to operate from the independent power source in the absence of the mains power or when sub-optional power conditions are detected in the mains power supply.

Preferably, the controller is arranged to control the cooling pump(s) and/or fan(s) to operate for a predetermined time period in the absence of mains power or when sub-optimal power conditions are detected in the mains power supply.

Preferably, the controller is arranged to control the cooling pump(s) and/or fan(s) to operate until the microCHP unit has reached a safe shut down temperature.

Preferably, the independent power source is a battery.

Preferably, the controller is a microcontroller.

Preferably, the microCHP unit comprises both a voltage up converter and a voltage inverter.

In broad terms in a second aspect the invention comprises a method for shutting down a microCHP unit in the absence of mains power supply, the microCHP unit including at least one pump and/or fan for circulating a cooling fluid or air through the microCHP unit in normal operation, the method comprising the steps of:

a) providing an electric power source independent from the mains power supply;

b) providing a voltage converter or inverter or both connected between the independent power source and the cooling pump(s) and/or fan(s) of the microCHP unit for converting a supply voltage from the independent electric power source to a different voltage for operating the pump(s) and/or fan(s);

c) controlling with a controller the cooling pump(s) and/or fan(s) to operate in the absence of mains power; and d) charging the independent power source with a charging device when the mains power supply is available.

Preferably, the controller is arranged to sense both loss of power supply and sub-optimal power conditions from the mains power supply and to control the cooling pump(s) and/or fan(s) to operate from the independent power source in the absence of the mains power or when sub-optimal power conditions are detected in the mains power supply.

Preferably, the controller is arranged to control the cooling pump(s) and/or fan(s) to operate for a predetermined time period in the absence of mains power or when sub-optimal power conditions are detected in the mains power supply.

Preferably, the controller is arranged to control the cooling pump(s) and/or fan(s) to operate until the microCHP unit has reached a safe shut down temperature.

Preferably, the independent power source is a battery.

Preferably, the controller is a microcontroller.

Preferably, the microCHP unit comprises both a voltage up converter and a voltage inverter.

In broad terms in a third aspect the invention comprises a microCHP unit including a pump for circulating a cooling fluid through and a fan for circulating cooling air around the microCHP unit and which are powered from mains power supply, in normal operation, and comprising:

a battery and a charging device arranged to normally maintain the charge of the battery from the mains power supply;

a power converter or inverter or both for converting power from the battery to a mains supply voltage and frequency; and a controller arranged to cause the pump and fan to continue to operate powered from said battery through said power converter and/or inverter after a loss of mains power supply, for a predetermined time period after loss of mains supply and/or until the microCHP has reached a predetermined temperature lower than a normal operating temperature.

In broad terms in a fourth aspect the invention comprises a microCHP unit including at least one pump and one fan for circulating a cooling fluid or air through the microCHP unit in normal operation, and comprising:

an electric power source independent from the mains power supply connected to at least one of the cooling pump(s) and/or fan(s) and arranged to supply power to the pump(s) and/or fan(s); and a charging device connected between the independent power source and the mains power supply and arranged to charge the independent power source when the mains power supply is available.

Preferably, the microCHP unit comprises a voltage converter or inverter or both connected between the independent power source and at least one other cooling pump(s) and/or fan(s) of the microCHP unit for converting a supply voltage from the independent electric power source to a different voltage for operating the cooling pump(s) and/or fan(s).

Preferably, the microCHP comprises a controller arranged to cause the cooling pump(s) and/or fan(s) to operate in the absence of mains power.

Preferably, the controller is arranged to sense both loss of power supply and sub-optimal power conditions from the mains power supply and to cause the cooling pump(s) and/or fans(s) to operate from the independent power source in the absence of the mains power or when sub-optimal power conditions are detected in the mains power supply.

Preferably, the controller is arranged to cause the cooling pump(s) and/or fan(s) to operate for a predetermined time period in the absence of mains power or when sub-optimal power conditions are detected in the mains power supply.

Preferably, the controller is arranged to control the cooling pump(s) and/or fan(s) to operate until the microCHP unit has reached a safe shut down temperature.

Preferably, the independent power source is a battery.

Preferably, the controller is a microcontroller.

Preferably, the microCHP unit comprises both a voltage up converter and a voltage inverter.

In broad terms in a fifth aspect the invention comprises a method for shutting down a microCHP unit in the absence of mains power supply, the microCHP unit including at least one pump and one fan for circulating a cooling fluid or sir through the microCHP unit in normal operation, the method comprising the steps of:

a) providing an electric power source independent from the mains power supply connected to at least one of the cooling pump(s) and/or fan(s) and arranged to supply power to the pump(s) and/or fan(s);

b) providing a charging device connected between the independent power source and the mains power supply;

c) charging the independent power source with the charging device when the mains power supply is available.

Preferably, microCHP unit comprises a voltage converter or inverter or both connected between the independent power source and at least one other cooling pump(s) and/or fan(s) of the microCHP unit for converting a supply voltage from the independent electric power source to a different voltage for operating the cooling pump(s) and/or fan(s).

Preferably, the microCHP unit comprises a controller arranged to cause the cooling pump(s) and/or fan(s) to operate in the absence of mains power.

Preferably, the controller is arranged to sense both loss of power supply and sub-optimal power conditions from the mains power supply and to control the cooling pump(s) and/ or fan(s) to operate from the independent power source in the absence of the mains power or when sub-optimal power conditions are detected in the mains power supply.

Preferably, the controller is arranged to control the cooling pump(s) and/or fan(s) to operate for a predetermined time period in the absence of mains power or when sub-optimal power conditions are detected in the mains power supply.

Preferably, the controller is arranged to control the cooling pump(s) and/or fan(s) to operate until the microCHP unit has reached a safe shut down temperature.

Preferably, the independent power source is a battery.

Preferably, the controller is a microcontroller.

Preferably, the microCHP unit comprises both a voltage up converter and a voltage inverter.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The invention consists in the foregoing and also envisages constructions of which the following gives examples only.

BRIEF DESCRIPTION OF THE FIGURE

The invention is further described with reference to the accompanying FIGURE by way of example and without intending to be limiting, which is a block diagram subsystem of a preferred embodiment of a microCHP unit of the invention.

DETAILED DESCRIPTION OF PREFERRED EMBODIMENTS

A microCHP unit generally comprises a generator or alternator driven by an engine to generate electricity. One or typically both of waste heat in the water cooling circuit of the engine and in cooling air circulated around the engine by a fan, is/are used to for space heating or water heating or both. The electricity generated by the generator may be used to supply power to a household or may be fed back to the mains power supply or both. Generally the engine is a combustion engine such as an internal or external combustion engine. The engine may be a Stirling engine. Typically the microCHP comprises at least one water pump and at least one fan which circulate cooling water and air through the engine during operation, and which are typically powered from the mains supply The system 30 depicted in the FIGURE is a subsystem of a preferred embodiment domestic microCHP unit of the invention. The subsystem 30 comprises an electric power source 32 that is independent from the mains power supply, such as a battery, which in the preferred embodiment is a 12 volt direct current lead-acid battery for example. The microCHP comprises at least one pump 20 which circulates fluid typically water through the engine to extract heat and cool the engine, and at least one fan 28 which circulates air through the microCHP to also extract heat, both of which are normally powered from the mains supply when the microCHP is operating. When the microCHP unit is running under normal conditions with mains power supply, the battery 32 is maintained charged.

In the microCHP of the invention, in the event of a lack of mains power supply occurring, resulting in the microCHP unit being caused to shut down, the subsystem 30 operates automatically, to continue supplying power to the pump 20 and fan 28. Thus the pump 20 and fan 28 do not cease but continue operating after loss of mains supply, and continue to remove residual heat from the microCHP unit, thereby avoiding damage to the Stirling engine and other components of the unit.

The subsystem 30 comprises control circuitry which is based around a central control unit 34 which is a microprocessor or microcontroller for example. In the preferred embodiment the controller 34 comprises a timer 36 and uses the signal from the timer 36 to supply control signals 38, 40. The first control signal 38 controls switches of a first switch mode power supply (SMPS) 42. The switches can be P or N channel MOSFETS for example and the SMPS 42 can be a push-pull forward converter for example. A single stage power conversion stage may be provided but in the preferred embodiment the SMPS 42 up-converts the battery voltage to a higher voltage level and/or frequency for example from 12 volts DC from the battery to 190 volts DC, and second control signal 40 from the controller 34 controls a second SMPS 44 which further up-converts the output from the first SMPS 42. The output power of the second SMPS 44 is at a voltage suitable for driving the pump 20 and fan 28, typically mains supply voltage and frequency where the pump 20 and fan 28 are normally powered from the mains supply, such as 230 or 120 volts AC at 50 Hz. The second SMPS 44 is an H-bridge inverter for example where the second control signal 40 is a PWM signal created by comparing a 50 HZ reference signal to a kHz sawtooth signal for example.

The controller 34 also comprises a sensor 46 arranged to detect loss of mains power supply. The sensor may be any suitable type of sensor such as an ADC pin on the controller 34. The controller 34 is also arranged to switch the input power source for the pump 20 and fan 28 from the mains power supply to the output of the second SMPS 44 (which is indirectly the power output of the independent electric power source 32), when the sensor 46 senses loss of mains supply. In a preferred embodiment the controller 34 is also arranged to also switch to the independent power source when sensor 46 indicates sub-optimal mains power supply such as any one or more of over voltage, under voltage, over frequency, under frequency, or any other undesirable power condition. At the same time that the microCHP unit shuts down on loss of mains supply, or on sub-optimal mains supply, the controller causes the pump 20 or the fan 28 or both to continue to run for a limited time sufficient to prevent damage to the microCHP which may otherwise occur. This continued running time may be fixed e.g. 5 minutes, or may be variable and calculated by the controller based on the operating conditions of the microCHP unit at shut down such as temperature. Alternatively again the controller may monitor the microCHP temperature and cause the cooling pump(s) and/or fan(s) to operate until the microCHP unit has reached a predetermined safe shut down temperature. In any case, subsequently the pump 20 and fan 28 are shut down by the controller 34 when the microCHP unit has reached a safe shut down temperature.

The subsystem 30 also comprises a charging device 48 powered from the mains supply and which is connected to supply power to the electric power source 32 when the mains supply is present. When the mains power supply fails, the electric power source 32 will supply power to the pump 20 and fan 28 for a limited amount of time as described above, discharging the electric power source 32. When the mains power supply comes back online and the microCHP unit begins to run again, the controller 34 will send a signal to the charging device 48 to cause it to begin recharging the electric power source 32.

Another preferred embodiment microCHP unit may have the independent source 32 supplying power directly to the pump 20 or fan 28 or both. In this embodiment the independent power source 32 is preferably a DC power source such as a 12V direct current lead-acid battery, pump 20 is preferably a DC pump, the fan 28 is preferably a DC fan. The independent power source 32 supplies DC power to the pump 20 or fan 28 or both when the microCHP unit is running normally. The independent power source 32 may be constantly charged with power from the mains preferably using a charging device 48.

In the event of a lack of mains power supply or sub-optimal mains power supply occurring, resulting in the microCHP unit being caused to shut down, the independent power source 32 is able to continue supplying power to the pump 20 and fan 28. The pump 20 and fan 28 continue to remove residual heat from the microCHP unit, thereby avoiding damage to the Stirling engine and other components of the unit. The sensor 46 is arranged to detect loss of mains power supply and when such a condition is detected the controller 34 may be arranged to control the pump 20 and fan 28 to run for a limited time sufficient to prevent damage to the microCHP which may otherwise occur. This continued running time may be fixed e.g. 5 minutes, or may be variable and calculated by the controller based on the operating conditions of the microCHP unit at shut down such as temperature. Alternatively again the controller may monitor the microCHP temperature and cause the cooling pump(s) and/or fan(s) to operate until the microCHP unit has reached a predetermined safe shut down temperature. In any case, subsequently the pump 20 and fan 28 are shut down by the controller 34 when the microCHP unit has reached a safe shut down temperature. During this time the independent power source 32 will be partially or fully discharged as it will not be continuously charged from the mains supply through the charging device 48. When the mains supply is returned, the charging device 48 may recharge independent power source 32 fully before starting the microCHP unit. Alternatively, the independent power source 32 may be charged by charging device 48 and simultaneously supply power to run the pump 20 and fan 28.

Some embodiments of the invention may require one of the pump 20 and fan 28 to be run directly from the independent power source 32 while the other of the pump 20 and fan 28 be run directly from the mains. For example, a DC fan may be run directly from the independent power source 32 and an AC pump may be run directly from the mains power supply. The first SMPS 42 and second SMPS 44 are preferably provided. The independent power source 32 is kept constantly charged as described above to run the pump 20 or fan 28. In the event of lack of mains supply or sub-optimal mains supply, the first SMPS 42 and second SMPS 44 are controlled by the controller 34 to supply power in a suitable form from the independent power source 32 to the other of the pump 20 or fan 28 as also described above. The controller 34 may be arranged to cause the pump 20 and fan 28 to run for a predetermined amount of time as described above. One of the pump 20 and fan 28 has power supplied directly from the independent power source 32 and the other has power supplied indirectly from the electric power source 32 through first SMPS 42 and second SMPS 44. When the mains supply is returned, the charging device 48 may recharge independent power source 32 fully before starting the microCHP unit. Alternatively, the independent power source 32 may be charged by charging device 48 and simultaneously supply power to run the pump 20 and fan 28.

The foregoing describes the invention including a preferred form thereof. Alterations and modifications as would be obvious to those skilled in the art are intended to be incorporated within the scope hereof as described in the accompanying claims.

The invention claimed is:

1. A microCHP unit including at least one pump and/or fan for circulating a cooling fluid or air through the microCHP unit in normal operation, and comprising:

an electric power source independent from the mains power supply;

a voltage converter or inverter or both connected between the independent power source and the cooling pump(s) and/or fan(s) of the microCHP unit for converting a supply voltage from the independent electric power source to a different voltage for operating the pump(s) and/or fan(s);

a controller arranged to cause the cooling pump(s) and/or fan(s) to operate in the absence of mains power;

a charging device arranged to recharge the independent power source when the mains power supply is available, and where the controller is arranged to sense both loss of power supply and sub-optimal power conditions from the mains power supply and to cause the cooling pump(s) and/or fans(s) to operate from the independent power source in the absence of the mains power or when sub-optimal power conditions are detected in the mains power supply, and wherein the controller is arranged to control the cooling pump(s) and/or fan(s) to operate until the microCHP unit has reached a safe shut down temperature.

2. A microCHP unit according to claim 1 where the controller is arranged to cause the cooling pump(s) and/or fan(s) to operate for a predetermined time period in the absence of mains power or when sub-optimal power conditions are detected in the mains power supply.

3. A microCHP unit according to claim 1 comprising both a voltage up converter and a voltage inverter.

4. A microCHP unit including at least one pump and/or fan for circulating a cooling fluid and/or air through the microCHP unit in normal operation, and comprising:

an electric power source independent from the mains power supply connected to at least one of the cooling pump(s) and/or fan(s) and arranged to supply power to the pump(s) and/or fan(s);

a controller arranged to cause the cooling pump(s) and/or fan(s) to operate in the absence of mains power;

a charging device connected between the independent power source and the mains power supply and arranged to charge the independent power source when the mains power supply is available, and where the controller is arranged to sense both loss of power supply and sub-optimal power conditions from the mains power supply and to cause the cooling pump(s) and/or fans(s) to operate from the independent power source in the absence of the mains power or when sub-optimal power conditions are detected in the mains power supply, and wherein the controller is arranged to control the cooling pump(s) and/or fan(s) to operate until the microCHP unit has reached a safe shut down temperature.

5. A microCHP unit according to claim 4 comprising a voltage converter or inverter or both connected between the independent power source and at least one other cooling pump(s) and/or fan(s) of the microCHP unit for converting a supply voltage from the independent electric power source to a different voltage for operating the cooling pump(s) and/or fan(s).

6. A microCHP unit according to claim 4 where the controller is arranged to cause the cooling pump(s) and/or fan(s) to operate for a predetermined time period in the absence of mains power or when sub-optimal power conditions are detected in the mains power supply.

7. A microCHP unit according claim 4 comprising both a voltage up converter and a voltage inverter.

8. A method for shutting down a microCHP unit in the absence of mains power supply, the microCHP unit including at least one pump and/or fan for circulating a cooling fluid and/or air through the microCHP unit in normal operation, the method comprising the steps of:

a) providing an electric power source independent from the mains power supply connected to at least one of the cooling pump(s) and/or fan(s) and arranged to supply power to the pump(s) and/or fan(s);

b) providing a controller arranged to cause the cooling pump(s) and/or fan(s) to operate in the absence of mains power;

c) providing a charging device connected between the independent power source and the mains power supply;

d) charging the independent power source with the charging device when the mains power supply is available;

e) sensing both loss of power supply and sub-optimal power conditions from the mains power supply and to control the cooling pump(s) and/or fan(s) to operate from the independent power source in the absence of the mains power or when sub-optimal power conditions are detected in the mains power supply, and f) arranging to control the cooling pump(s) and/or fan(s) to operate until the microCHP unit has reached a safe shut down temperature.

9. A method for shutting down a microCHP unit in the absence of mains power supply according to claim 8 where the microCHP unit comprises a voltage converter or inverter or both connected between the independent power source and at least one other cooling pump(s) and/or fan(s) of the microCHP unit for converting a supply voltage from the independent electric power source to a different voltage for operating the cooling pump(s) and/or fan(s).

10. A method for shutting down a microCHP unit in the absence of mains power supply according to claim 8 where the controller is arranged to control the cooling pump(s) and/or fan(s) to operate for a predetermined time period in the absence of mains power or when sub-optimal power conditions are detected in the mains power supply.

11. A method for shutting down a microCHP unit in the absence of mains power supply according to claim 8 where the microCHP unit comprises both a voltage up converter and a voltage inverter.

* * * * *